US006351343B1

(12) United States Patent
Nakagawa et al.

(10) Patent No.: US 6,351,343 B1
(45) Date of Patent: Feb. 26, 2002

(54) ARRANGEMENT STRUCTURE OF THE PRINTED CIRCUIT BOARD AND THE INTERFACE CABLE CONNECTOR OF A MAGNETIC DISK DRIVE

(75) Inventors: Yuzo Nakagawa, Hiratsuka; Kiyoshi Satoh, Ayase; Hiroki Kitahori; Naoyuki Kagami, both of Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 08/798,443

(22) Filed: Feb. 10, 1997

Related U.S. Application Data

(63) Continuation of application No. 08/543,077, filed on Oct. 13, 1995, now abandoned.

(30) Foreign Application Priority Data

Oct. 28, 1994 (JP) ............................................. 6-265131

(51) Int. Cl.[7] ................................................ G11B 33/12
(52) U.S. Cl. .................................................... 360/97.01
(58) Field of Search ............................ 360/97.01, 98.01

(56) References Cited

U.S. PATENT DOCUMENTS

| | | | | | |
|---|---|---|---|---|---|
| 4,930,029 | A | * | 5/1990 | Morita | 360/97.01 |
| 5,038,239 | A | * | 8/1991 | Vettel et al. | 360/98.01 |
| 5,392,175 | A | * | 2/1995 | Beecroft | 360/97.01 |
| 5,396,384 | A | * | 3/1995 | Caldeira et al. | 360/98.01 |
| 5,420,733 | A | * | 5/1995 | Knighton et al. | 360/97.01 |
| 5,502,604 | A | * | 3/1996 | Furay | 360/97.01 |

* cited by examiner

*Primary Examiner*—William Klimowicz
(74) *Attorney, Agent, or Firm*—Altera Law Group, LLC

(57) ABSTRACT

An arrangement structure of the printed circuit board and the interface cable connector of a magnetic disk drive for increasing the degree of freedom of the arrangement of a spindle motor, and for minimizing the size of a printed circuit board. An interface cable connector is disposed on the side opposite to the spindle motor, and the printed circuit board is sized so as not to contact with the spindle motor in the height direction. This allows the degree of freedom of the arrangement of the spindle motor to increase. Further, the distance between the interface cable connector and the preamplifier connector on the printed circuit board is short. Thus, the size of the printed circuit board can be made as small as possible.

14 Claims, 5 Drawing Sheets

22 24 26 14 32 42 40 46 48 12 52 18 50

10 14 16 12 42 48 40 32 30 26 24 46 38 44 18 28 36 22 52 50

ARRANGEMENT STRUCTURE OF THE PRINTED CIRCUIT BOARD AND THE INTERFACE CABLE CONNECTOR OF A MAGNETIC DISK DRIVE

This is a continuation of application Ser. No. 08/543,077, filed Oct. 13, 1995, now abandoned.

FIELD OF THE INVENTION

1. Field of the Invention

The present invention is related in general to a printed circuit board and interface cable connector of a magnetic disk drive, and more particularly, to an arrangement structure of the printed circuit board and the interface cable connector of a magnetic disk drive having a magnetic disk mounted thereon.

2. Description of Related Art

Due to increased competition among hard disk drive manufacturers, hard disk drive technology continue to advance at a rapid pace. Hard disk drives are required to provide higher-speed operation, be more compact and inexpensive, and to deliver a lower power dissipation. However, these goals are often difficult to achieve. For example, the need to make hard disk drives more compact leads to manufacturing difficulties and increased cost.

As shown in FIG. 5, in a magnetic disk drive 100 of this type, a magnetic disk 112 is contained in an enclosure case made by closing a base with a cover, and the magnetic disk 112 is driven by a spindle motor 110 provided on the inner surface of the base. In the enclosure case, a carriage 120 is also provided, and the carriage 120 is caused to swing by an actuator motor using a VCM 114 or the like, whereby the position of the magnetic head at the distal end of the carriage 120 is controlled on the magnetic disk so as to read/write magnetic information.

Further, a printed circuit board 102 substantially equal to the half projection area of the magnetic disk drive 100 is fixed to the outside of the base for controlling the magnetic disk drive 100. To one end of the printed circuit board 102 is connected an interface cable connector 104 for connection to a main CPU. At a position on the printed circuit board 102 opposite to the interface cable connector 104, a preamplifier connector 118 is provided.

The preamplifier connector 118 is disposed at a position opposite to the interface cable connector 104 as described above to shorten the wiring distance between the preamplifier 108. Also, the interface connector 104 is disposed at a position on the spindle motor 110 side (opposite to the VCM 114) so that electrical restrictions, such as the signal intensity according to the signal flow as seen from the interface connector 104, digital, analog, and noise, and the mechanical restrictions, such as the position and size of the VCM provided in the enclosure case, are minimized.

However, assuming that the printed circuit board and the interface cable connector have the arrangement construction as described above, the printed circuit board and the spindle motor are contending with each other for the space both in the height direction and in the lateral direction, and thus there is a problem that the spindle motor is mechanically restricted and it is difficult to select an optimum design point.

On the other hand, the degree of integration and performance of LSIs and other parts mounted on a printed circuit board has been increasing.

In view of the above fact, it is the object of the present invention to provide an arrangement structure of the printed circuit board and the interface connector of a magnetic disk drive which can increase the degree of freedom of the arrangement construction of the spindle motor while satisfying the electrical requirements.

SUMMARY OF THE INVENTION

To overcome the limitations in the prior art described above, and to overcome other limitations that will become apparent upon reading and understanding the present specification, the present invention discloses an arrangement structure of a printed circuit board and an interface cable connector for a disk drive.

The present invention solves the above-described problems by placing the interface cable connector on the side opposite to the spindle motor, and sizing the printed circuit board so as not to contact with the spindle motor in the height direction.

A system in accordance with the principles of the present invention comprises a device enclosure, at least one storage disk, a spindle motor having a shaft coupled to the disks for rotating the disk, a voice coil motor for controlling the position of a carriage which supports a magnetic head that is positioned relative to the disk for reading or writing magnetic information to and from the disk, a printed circuit board for controlling the magnetic disk drive, and an interface cable connector, coupled to the printed circuit board, for providing a connection from a main CPU to the printed circuit board. The printed circuit board is disposed on the outside of the enclosure case opposite to said carriage and said voice coil motor so as to avoid contact with the spindle motor projecting from the outside of said enclosure case. The interface cable connector is also disposed on the side opposite to said spindle motor. A preamplifier is mounted on the base for providing signals to the head. A flexible preamplifier cable is connected to the preamplifier, and is bent along a cutout provided in the base. The flexible preamplifier cable is connected to a preamplifier connector disposed on the rear of the printed circuit board. The printed circuit board includes a spindle motor connect to provide signals to and from the spindle motor. Thus, the printed circuit board provides signals to both the spindle motor and the carriage.

One aspect of the present invention is that the printed circuit board is disposed so as not to contact with the spindle motor and the interface cable connector is disposed on the side opposite to the spindle motor.

One aspect of the present invention is that the degree of freedom of the arrangement structure of the spindle motor can be increased without being limited by the printed circuit board.

Yet another aspect of the present invention is that the size of the printed circuit board can be optimized.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an improved arrangement structure of a printed circuit board and an interface cable connector for a disk drive apparatus.

Figure 1:
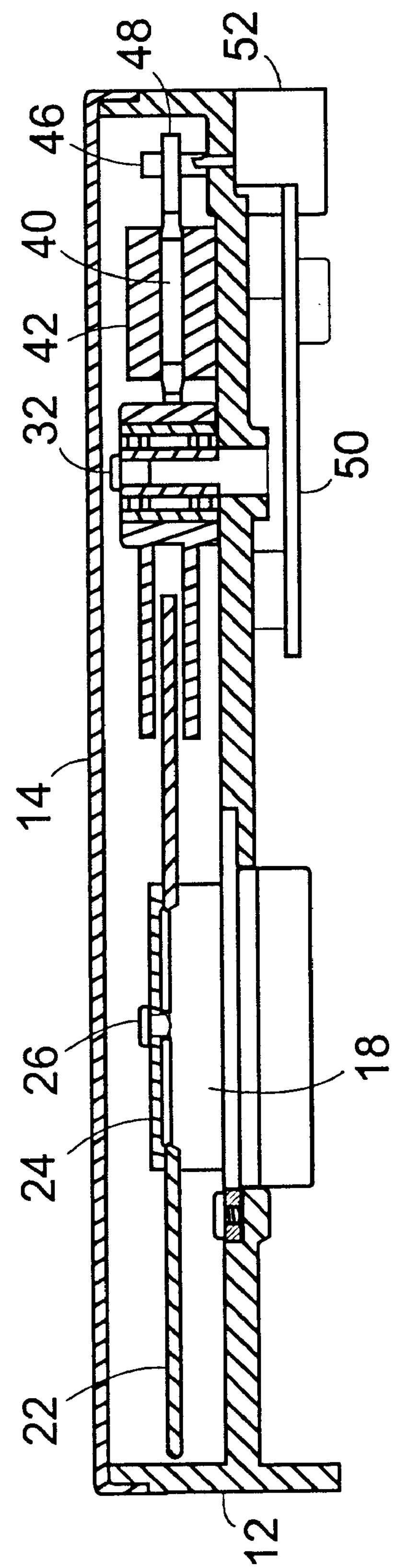
FIG. 1 is a longitudinal sectional view showing a hard disk drive which incorporates an embodiment of the arrangement structure of the printed circuit board and the interface cable connector of a magnetic disk drive related to the present invention.
Figure 2:
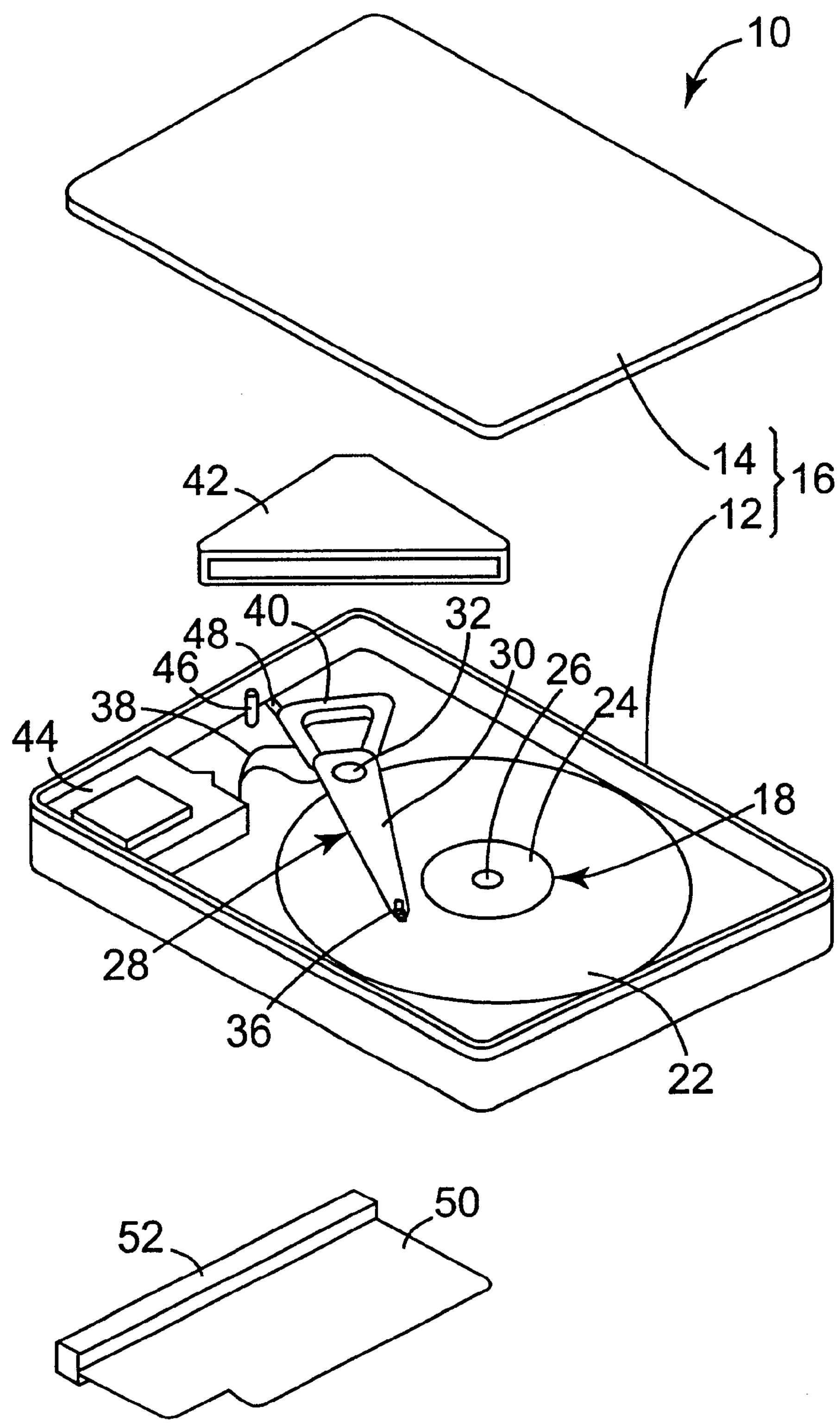
FIG. 2 is an exploded perspective view showing the hard disk drive of the embodiment.

Referring first to FIG. 2, a hard disk drive 10 is shown as a magnetic disk drive. The open top of a base 12 is closed with a cover 14 to form an enclosure case 16. The enclosure case 16 is shaped in a thin rectangular box and disposed horizontally in a computer, not shown. In the enclosure case, part of a spindle motor 18 of a hub-in structure is contained in the base 12. On the outer periphery of the hub of the spindle motor 18, a 3.5" magnetic disk 22 is mounted by fitting over the outer periphery, and the spindle motor 18 rotatively drives the magnetic disk 22. As shown in FIG. 1, the magnetic disk 22 is pressed and held by a screw 26 on the same shaft of the spindle motor 18 through a clamp 24.

Now referring again to FIG. 2, a carriage 28 is also provided in the enclosure case 16. In the carriage 28, one end of an arm 30 forming the support means is supported for swinging on the base 12 through a pivot 32. On the free end of the arm 30, a magnetic head 36 is provided on both sides of the magnetic disk 22 so as to face each other. On the arm 30, a coil 40 is provided opposite to the magnetic head 36 through the pivot 32, and the arm 30 is made to swing by the coil 40 and a VCM 42 provided so as to cooperate with the coil 40 (the coil 40 and the VCM 42 form an actuator). In addition, a stopper 48 is provided on the side of the coil 40, and the stopper 48 abuts on a pin 46 to restrict the swinging angle of the arm 30.

As shown in FIG. 1, a printed circuit board 50 is mounted on the outside (underside) of the base 12 for the inputting/outputting of power and signals between the spindle motor 18 and the carriage 28. FIG. 1 also shows the printed circuit board 50 having a length which is nearly ⅓ of the projection area of the enclosure case 16. LSIs and other parts are mounted on both sides of the printed circuit board 50. Further, on the printed circuit board 50, an interface connector 52 is connected on the side opposite to the spindle motor 18 (the VCM 42 side) for inputting/outputting signals between the main CPU.

Figure 3:
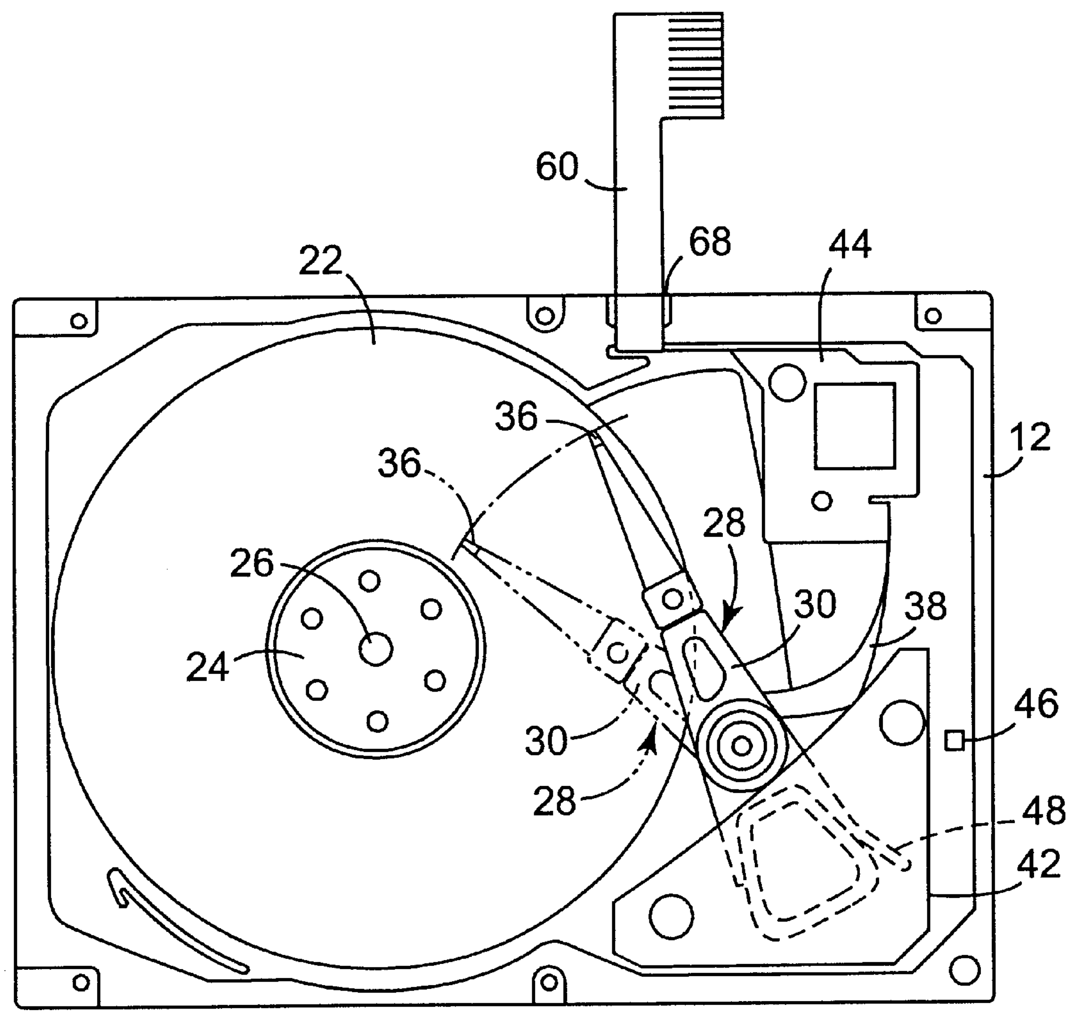
FIG. 3 is a plan view of the hard disk drive of the embodiment.

Now turning to FIG. 3, the inputting/outputting of signals between the carriage 28 and a preamplifier 44 are performed through flexible cable 38. The flexible cable 38 is flexible, thin and flat, so that it can follow the swing movement of the carriage 28. To the preamplifier 44 is connected a flexible preamplifier cable 60. The flexible preamplifier cable 60 is bent along a cutout 68 provided in the base 12.

Figure 4:
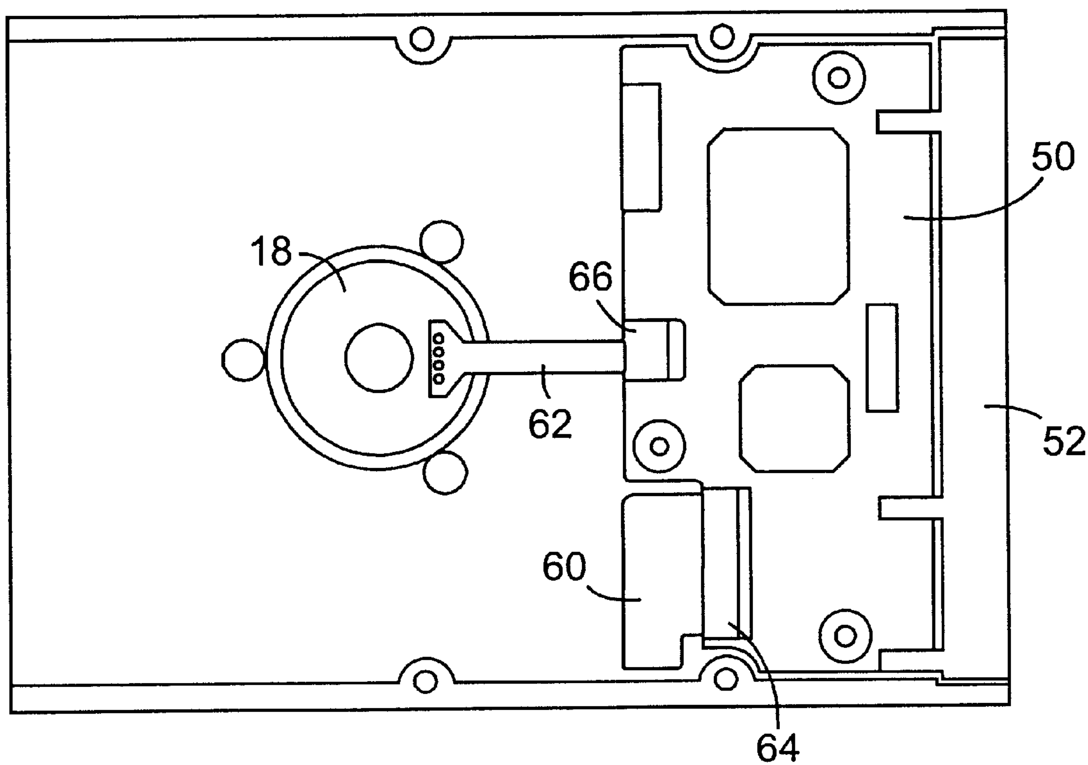
FIG. 4 is a bottom view of the hard disk drive of the embodiment.
Figure 5:
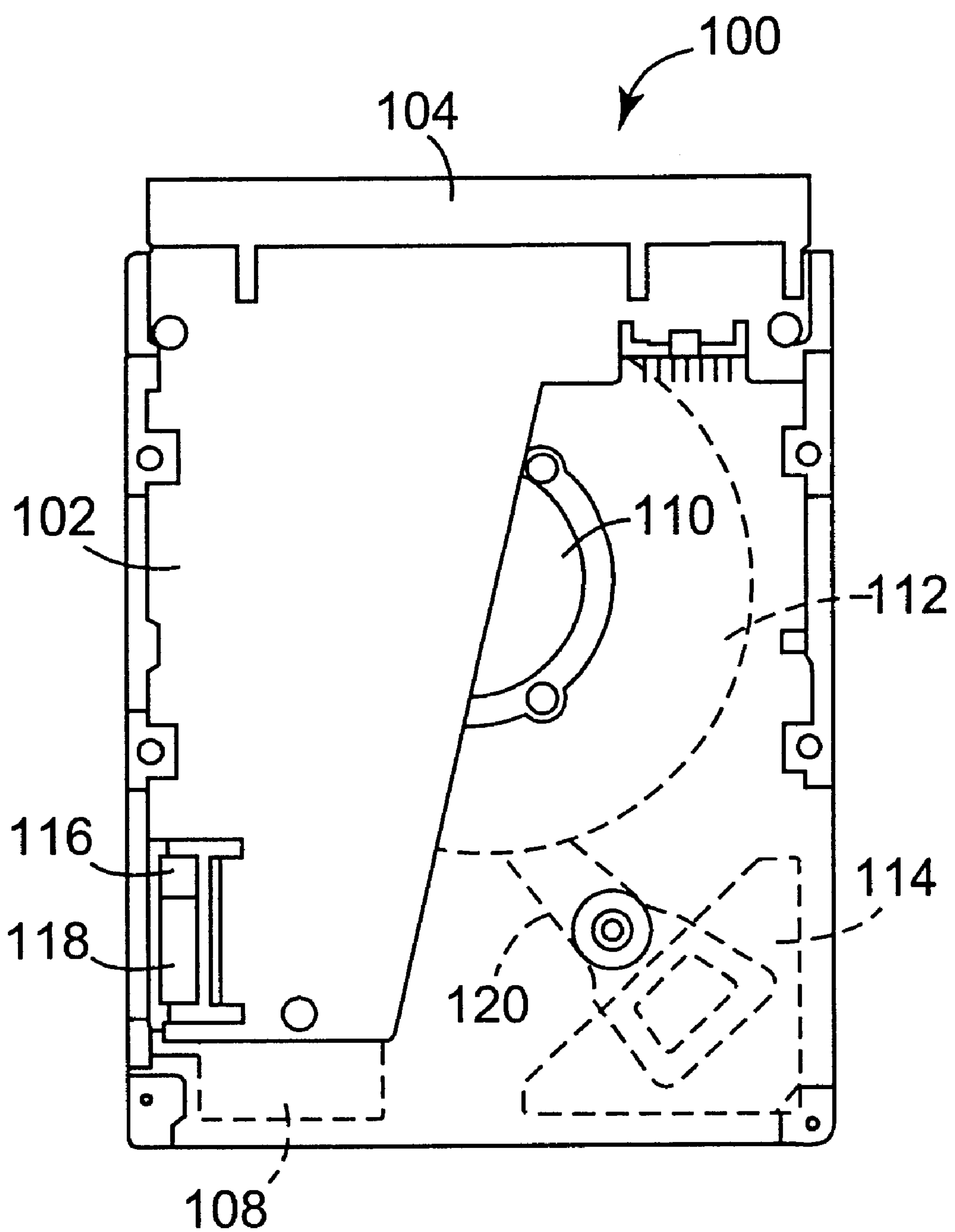
FIG. 5 is a bottom view of the conventional hard disk drive.

As shown in FIG. 4, the flexible preamplifier cable 60 is connected to the preamplifier connector 64 disposed on the rear of a printed circuit board 50. In addition, at a position of the printed circuit board 50 which is nearest to the spindle motor, a spindle motor connector 66 is provided. To the spindle motor connector 66 is connected a spindle motor flexible cable 62 which is flexible and thin. The spindle motor flexible cable 62 is to supply the driving power for the spindle motor 18, and inform the printed circuit board 50 of the rotating speed of the spindle motor 18 detected by a Hall device, not shown.

As shown in FIG. 1, the interface cable connector 52 is disposed in the end portion opposite to the spindle motor 18, and the printed circuit board 50 connected to the interface cable connector 52 is disposed below the carriage 28 and the VCM 42, so providing an arrangement construction in which the printed circuit board 50 does not contact with part of the spindle motor 18 projecting from the enclosure case 12.

Now, the action of the hard disk drive 10 of this embodiment is described.

Upon receipt of a predetermined signal from the main CPU, power is supplied from the printed circuit board 50 to the spindle motor 18, which rotates at a predetermined speed (4500 rpm). Then, power is supplied from the printed circuit board 50 to the coil 40 of the carriage 28 to swing the carriage 28, thereby the tracks of the magnetic disk 22 to be followed for reading/writing of magnetic information. Incidentally, these operations are controlled by a CPU, not shown, which is provided on the printed circuit board 50.

In accordance with the above construction, the interface cable connector 52 is disposed on the side opposite to the spindle motor 18, and the print circuit board 50 is sized so that it does not contact with the spindle motor 18 in the height direction.

In the conventional construction, the interface cable connector is disposed on the same side as the spindle motor. Since the preamplifier connector needs to be disposed near the preamplifier, the printed circuit board necessarily becomes long in the direction orthogonal with the interface cable connector. Thus, the height of the spindle motor is limited. There is no such limitation in this embodiment.

As described above, in accordance with the arrangement structure of this embodiment, the spindle motor 18 can be disposed without being restricted by the height of the printed circuit board 50. In addition, since the degree of freedom of the arrangement of the spindle motor 18 increases, it is also possible to increase the degree of freedom of the selection of the arrangement and size of the VCM 42.

Further, as shown in FIG. 4, in accordance with the arrangement construction of this embodiment, the distance between the interface cable connector 52 and the preamplifier connector 64 on the printed circuit board 50 can be made short. This allows the size of the printed circuit board 50 to be as small as possible.

Since the size of the printed circuit board 50 can be selected to be small as described above, the cost of the printed circuit board 50 can be reduced.

As described above, since the printed circuit board 50 is disposed so as not to contact with the spindle motor 18 and the interface cable connector 52 is disposed on the side opposite to the spindle motor 18, an advantage can be obtained that the degree of freedom of the arrangement structure of the spindle motor 18 can be increased without being limited by the printed circuit board 50, and the size of the printed circuit board 50 can be optimized.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. In a magnetic disk drive comprising:

a device enclosure having a bottom base and a cover;

at least one storage disk;

a spindle motor, coupled to and extending partially from the enclosure, the spindle motor having a shaft coupled to the disk for rotating the disk;

a voice coil motor, coupled to the enclosure, for controlling the position of a carriage, the carriage supporting a magnetic head, the head being positioned relative to the disk for reading or writing magnetic information to and from the disk;

a printed circuit board, coupled to the enclosure, for controlling the magnetic disk drive; and an interface cable connector, coupled to the printed circuit board, for providing a connection from a main CPU to the printed circuit board;

wherein said printed circuit board is disposed under the enclosure base generally beneath said carriage and said voice coil motor, wherein an entirety of the printed circuit board is positioned between the spindle motor and the interface cable connector.

2. The disk drive of claim 1 wherein a magnetic head is positioned on both sides of the storage disk at a free end of the carriage, the magnetic heads facing each other.

3. The disk drive of claim 1 wherein the printed circuit board is mounted for the inputting/outputting of power and signals between the spindle motor and the carriage.

4. The disk drive of claim 1 further comprising a preamplifier coupled to the printed circuit board at a preamplifier connector, wherein the distance between the interface cable connector and the preamplifier connector on the printed circuit board is minimized to allow the reduction in size of the printed circuit board.

5. The disk drive of claim 1, wherein no portion of the printed circuit board extends beneath the spindle motor.

6. The disk drive of claim 1, wherein the printed circuit board includes a first end portion positioned adjacent to the spindle motor, and a spindle motor connector positioned at the first end portion of the printed circuit board.

7. The disk drive of claim 6, wherein the printed circuit board includes a second end portion positioned opposite from the first end portion, and the interface cable connector is positioned at the second end portion.

8. The disk drive of claim 1, further comprising a spindle motor connector coupled to the printed circuit board and positioned at a region of the printed circuit board that is closest to the spindle motor.

9. The disk drive of claim 1, wherein the printed circuit board covers a minority of a bottom surface area of the enclosure base.

10. A magnetic disk drive comprising an enclosure case containing part of a spindle motor for rotating a magnetic disk and a voice coil motor for controlling the position of a carriage having a magnetic head for reading or writing magnetic information from/to said magnetic disk, and a printed circuit board having an interface cable connector attached to the outside of said enclosure case for connection to a main CPU, wherein said printed circuit board is disposed at a position underneath the enclosure case opposite to said carriage and said voice coil motor, the printed circuit board being disposed under the voice coil motor and shortened with respect to an area directly underneath said spindle motor, an entirety of the printed circuit board being located between the spindle motor and the interface cable connector, and said interface cable connector being disposed at an end of the printed circuit board positioned opposite to said spindle motor.

11. The disk drive of claim 10 wherein a magnetic head is provided on both sides of the magnetic disk at a free end of the carriage, the magnetic heads facing each other.

12. The disk drive of claim 10 wherein the printed circuit board is mounted for the inputting/outputting of power and signals between the spindle motor and the carriage.

13. The disk drive of claim 10 further comprising a preamplifier coupled to the printed circuit board at a preamplifier connector, wherein the distance between the interface cable connector and the preamplifier connector on the printed circuit board is minimized to allow the reduction in size of the printed circuit board.

14. In a magnetic disk drive comprising:

a device enclosure having a bottom base and a cover;

at least one storage disk;

a spindle motor, coupled to and extending partially from the enclosure, the spindle motor having a shaft coupled to the disk for rotating the disk;

a voice coil motor, coupled to the enclosure, for controlling the position of a carriage, the carriage supporting a magnetic head, the head being positioned relative to the disk for reading or writing magnetic information to and from the disk;

a printed circuit board, coupled to the enclosure, for controlling the magnetic disk drive; and an interface cable connector, coupled to the printed circuit board, for providing a connection from a main CPU to the printed circuit board;

wherein said printed circuit board is disposed outside the device enclosure at a position under the enclosure base, the printed circuit board being sized and shaped to cover a minority of a bottom surface of the enclosure case.

* * * * *